(12) United States Patent
Castellani et al.

(10) Patent No.: US 8,096,381 B2
(45) Date of Patent: Jan. 17, 2012

(54) SIMPLIFIED MOTORCYCLE

(75) Inventors: Fausto Castellani, Bologna (IT); Alan Jenkins, Thornborough (GB); Filippo Preziosi, Bologna (IT); Stefano Strappazzon, Bologna (IT); Lorenzo Uliani, Bologna (IT)

(73) Assignee: Ducati Motor Holding S.p.A., Bologna (IT)

( * ) Notice: Subject to any disclaimer, the term of this patent is extended or adjusted under 35 U.S.C. 154(b) by 47 days.

(21) Appl. No.: 12/474,525

(22) Filed: May 29, 2009

(65) Prior Publication Data

US 2009/0308677 A1   Dec. 17, 2009

(30) Foreign Application Priority Data

Jun. 4, 2008   (IT) .............................. MI2008A1026

(51) Int. Cl.
    *B62D 61/02*   (2006.01)
(52) U.S. Cl. ...................................... 180/219; 180/68.3
(58) Field of Classification Search .................. 180/219, 180/68.3
    See application file for complete search history.

(56) References Cited

U.S. PATENT DOCUMENTS

| 4,321,978 | A | * | 3/1982 | Tominaga et al. ............ 180/225 |
| 7,779,950 | B2 | * | 8/2010 | Hoeve et al. .................. 180/219 |
| 7,832,371 | B2 | * | 11/2010 | Fujita et al. ............... 123/184.21 |
| 2008/0277898 | A1 | * | 11/2008 | Chu et al. .................. 280/281.1 |

FOREIGN PATENT DOCUMENTS

JP          01273777 A   * 11/1989

* cited by examiner

*Primary Examiner* — Kevin Hurley
(74) *Attorney, Agent, or Firm* — Novak Druce + Quigg, LLP

(57) ABSTRACT

A motorcycle including a propelling group or engine, a saddle support, a support for the rear wheel and a front directional group including a handlebar integral to a steering headstock functionally associated to a supporting organ of the vehicle front wheel. The front group is connected to a box-like body incorporating the function of filtering box, constrained to the engine and apt to support the latter by connecting it, therethrough, to the front directional group. The support for the rear wheel and the saddle support being constrained to the engine. The vehicle not equipped with additional members apt to constrain the engine to the front directional group.

16 Claims, 6 Drawing Sheets

SIMPLIFIED MOTORCYCLE

This application claims the priority of Italian Patent Application No. MI 2008A 001026 filed on 4 Jun. 2008, incorporated herein by reference.

The object of the present invention is a motorcycle according to the preamble of the main claim.

A usual motorcycle comprises a propelling group or engine generally connected to the front directional group (comprising a handlebar, the associated steering headstock and the support of the front wheel usually defined by a big fork with single arm or with double arms) by means of a frame. The latter is constrained to such directional group and it can assume the most different shapes, such as for example a lattice-like shape defined by a plurality of tubular members. Other embodiments comprise box-like members, made of metal or composite material, extending above the engine up to the saddle group, said members supporting the propeller and such group. In all above-mentioned solutions the vehicle has a real frame supporting the engine and other components of the vehicle.

Such solution, even if it is optimal, involves a careful study with respect to the mechanical rigidity of the frame, to the mass thereof and to the "inner" aerodynamics apt to allow an adequate cooling of the engine. These elements (rigidity, mass and aerodynamics) have always involved a corresponding limitation in the planning freedom, apart from increasing the costs for performing the above mentioned studies.

Moreover, the presence of a real frame has always put limitations in positioning the mechanical and structural organs of the vehicle and, to various extent, it has even affected the whole aerodynamics of the vehicle.

The object of the present invention is to offer an improved motorcycle with respect to the known motorcycles.

In particular, the object of the invention is to offer a vehicle of the mentioned type having an efficient structure in terms of rigidity/mass ratio.

Another object is to offer a motorcycle with improved aerodynamics that is wherein the air flows downwards the usual radiator and directed towards the engine are optimized so as to increase the thermal exchange with the radiator itself.

An additional object is to offer a motorcycle with improved and enhanced features with respect to the known vehicles.

An additional object is to offer a motorcycle wherein it is possible obtaining a general embodiment rationalization and improvement in the arrangement of the various components thereof such as that of the electric circuit and that of the cooling circuit.

These and other objects which will result evident to the person skilled in the art are achieved by a motorcycle according to the enclosed claims.

For a better understanding of the present invention the following drawings are enclosed by simple way of example, but not with limiting purposes, wherein.

Figure 1:
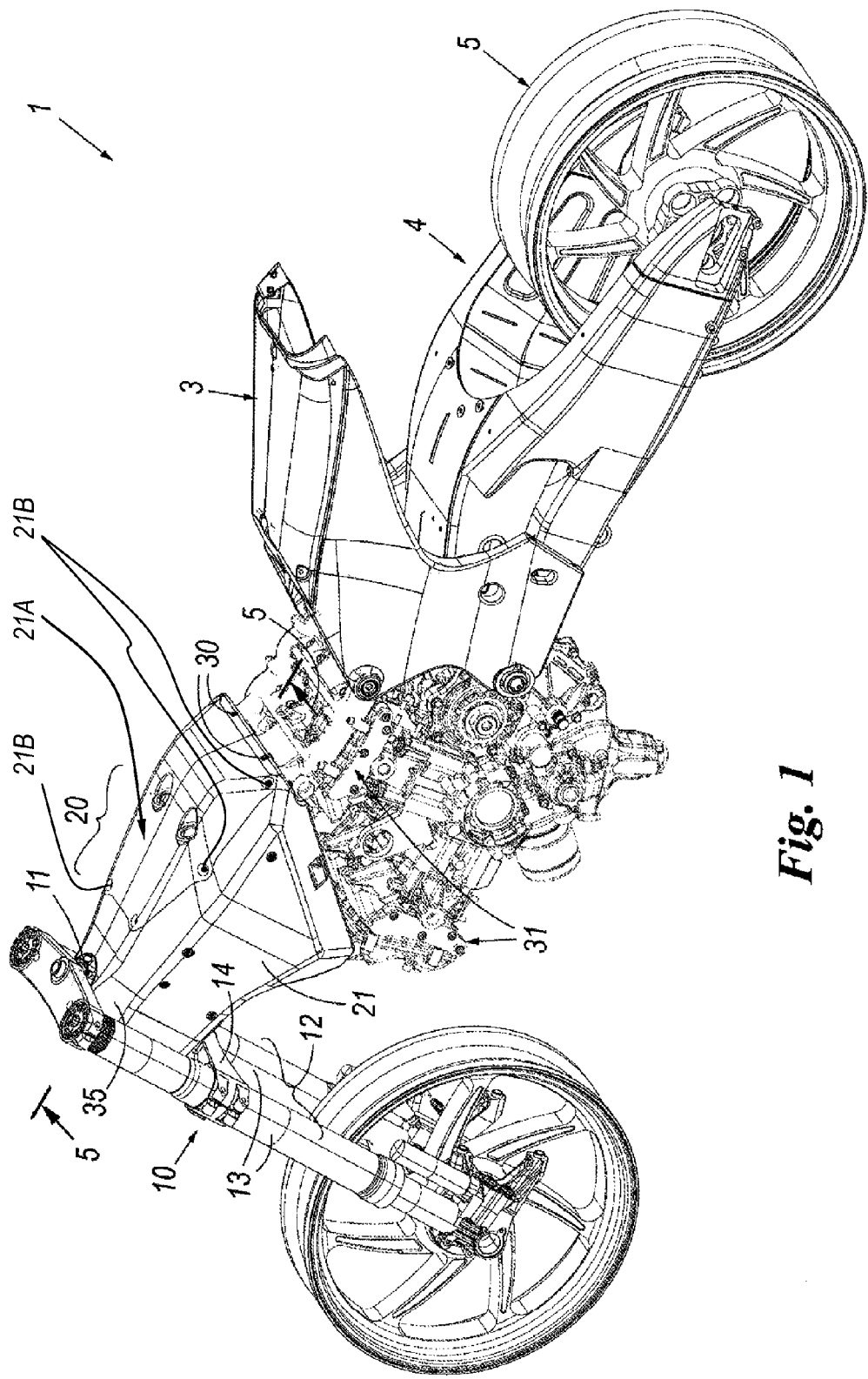
FIG. 1 shows a view of a motorcycle implemented according to the invention and without some portions for better clarity.
Figure 2:
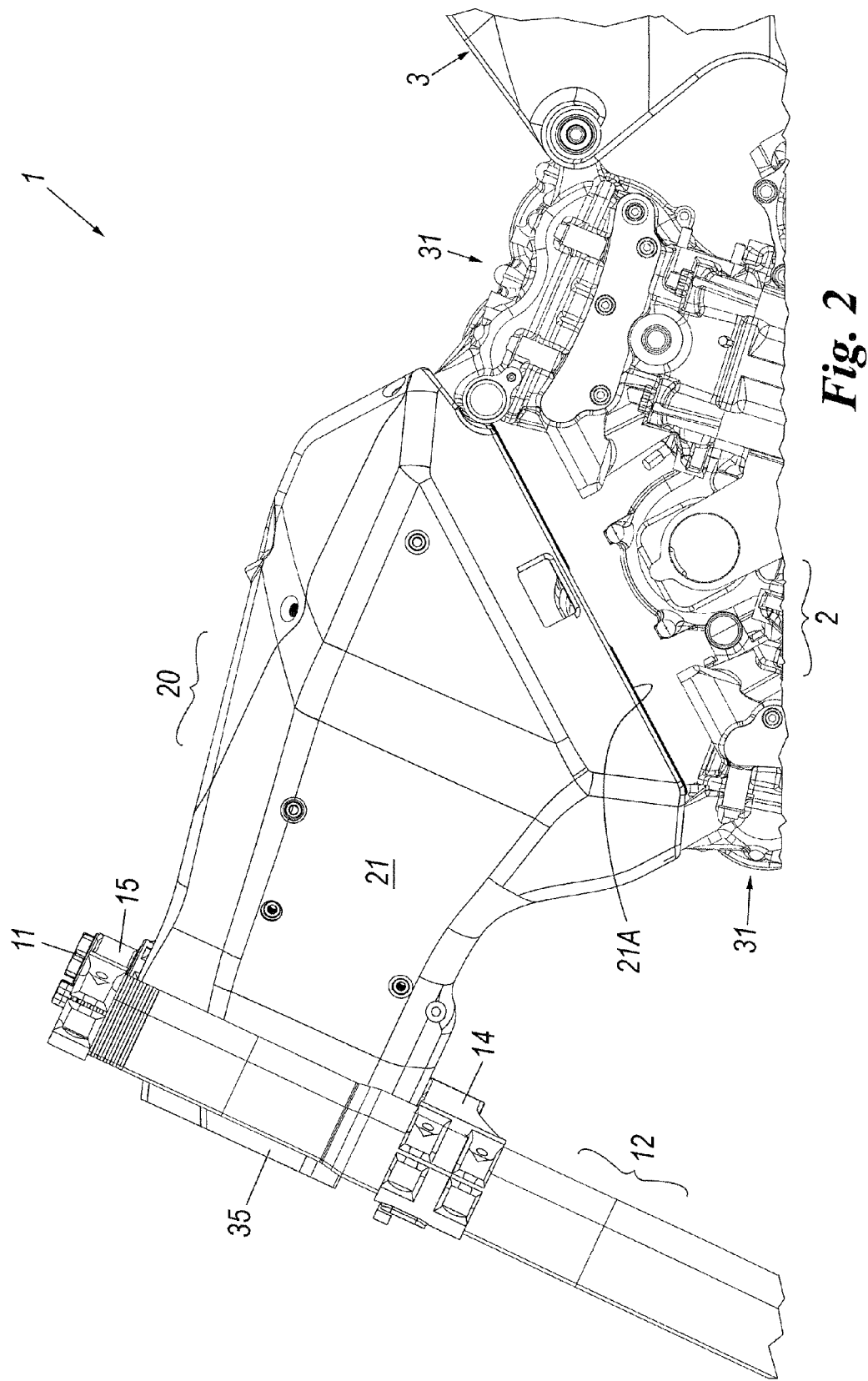
FIG. 2 shows an enlarged view of a portion of the motorcycle of FIG. 1.
Figure 3:
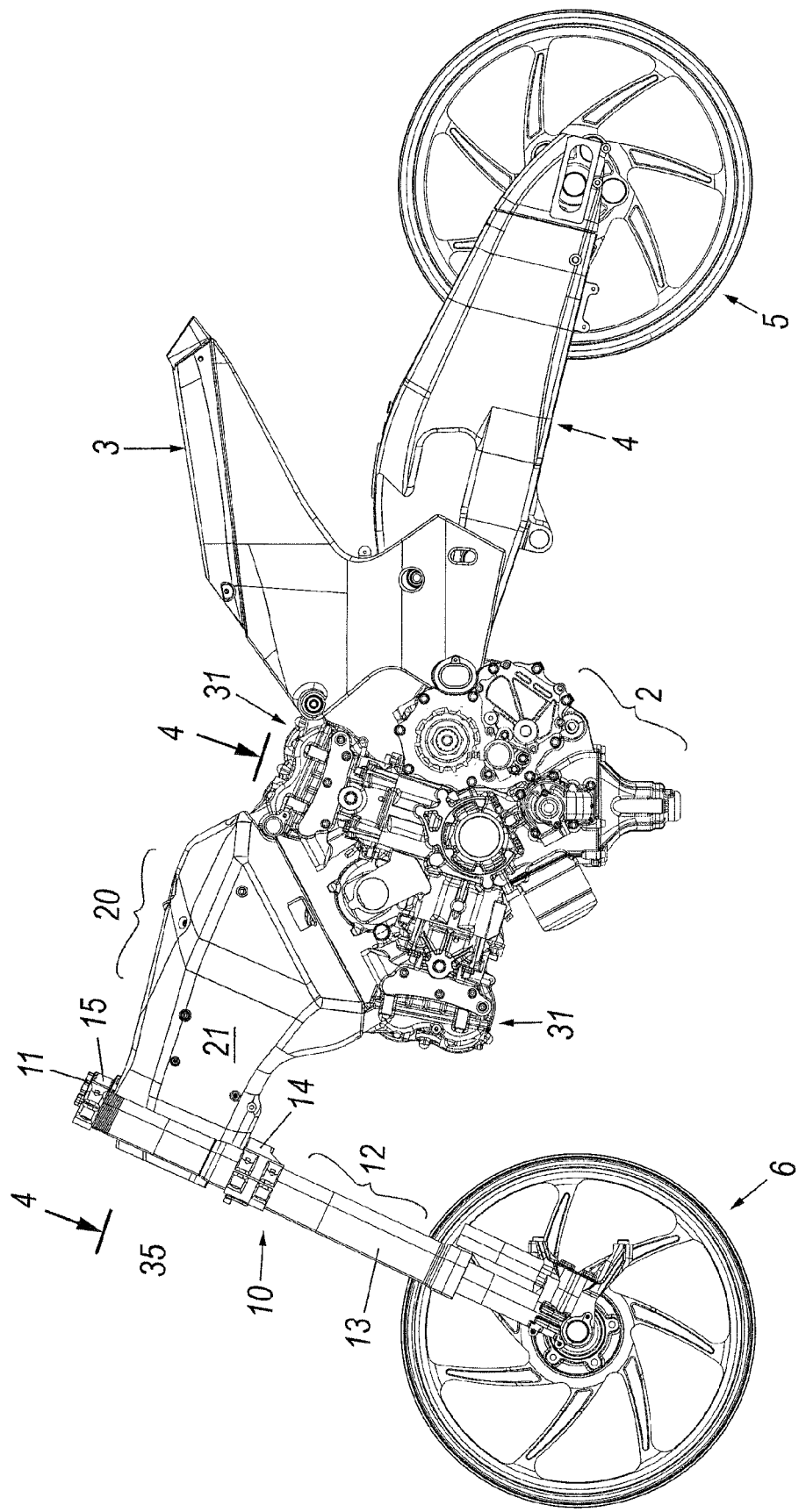
FIG. 3 shows a side view of the motorcycle of FIG. 1.

By referring to the above-mentioned figures, they show a motorcycle 1 without the tubular frame or other frame in the common sense of the word. Such vehicle comprises an engine or propelling group 2, a support for the saddle 3 and a support 4 for the rear wheel 5 (shown without tyre), said support 4 being, in the example, a big fork embracing the wheel 5, but it can also be defined by a single arm placed laterally the rear wheel 5 of the vehicle.

The motorcycle comprises a front directional group 10 defined by a handlebar (not shown) connected to a steering headstock 11 functionally connected to a supporting organ 12 of the front wheel 6 of the vehicle (in this case shown without tyre). In the example, such supporting organ 12 is a fork having telescopic arms 13 connected to upper plate 15 and lower plate 14 thereto the steering headstock 11 is connected. Obviously, the present document is not limited to the particular organ 12 shown in the figures, such organ can also have a different shape, known in the state of art.

Figure 4:
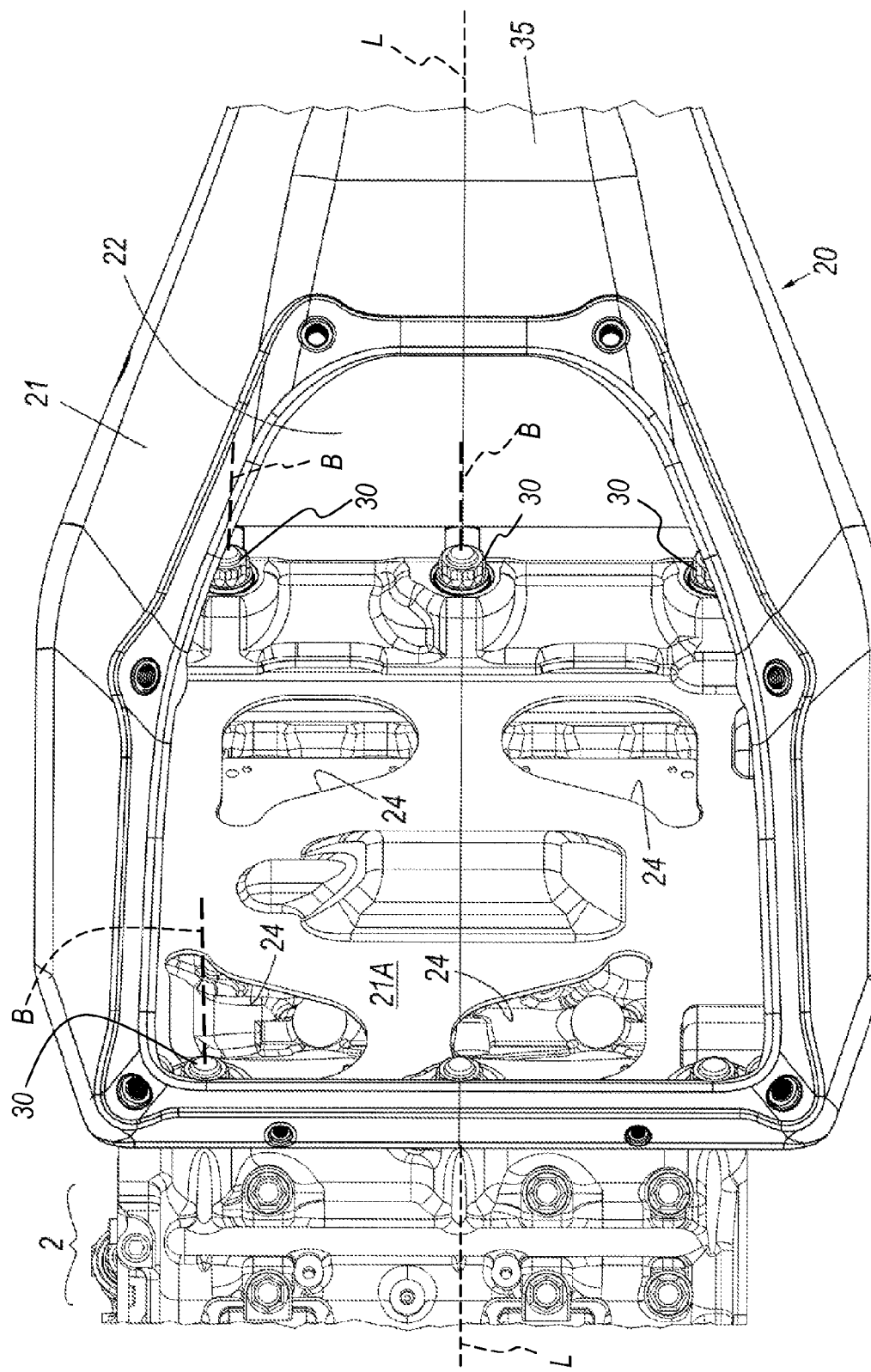
FIG. 4 shows a section according to the trace 4-4 of FIG. 3.
Figure 4A:
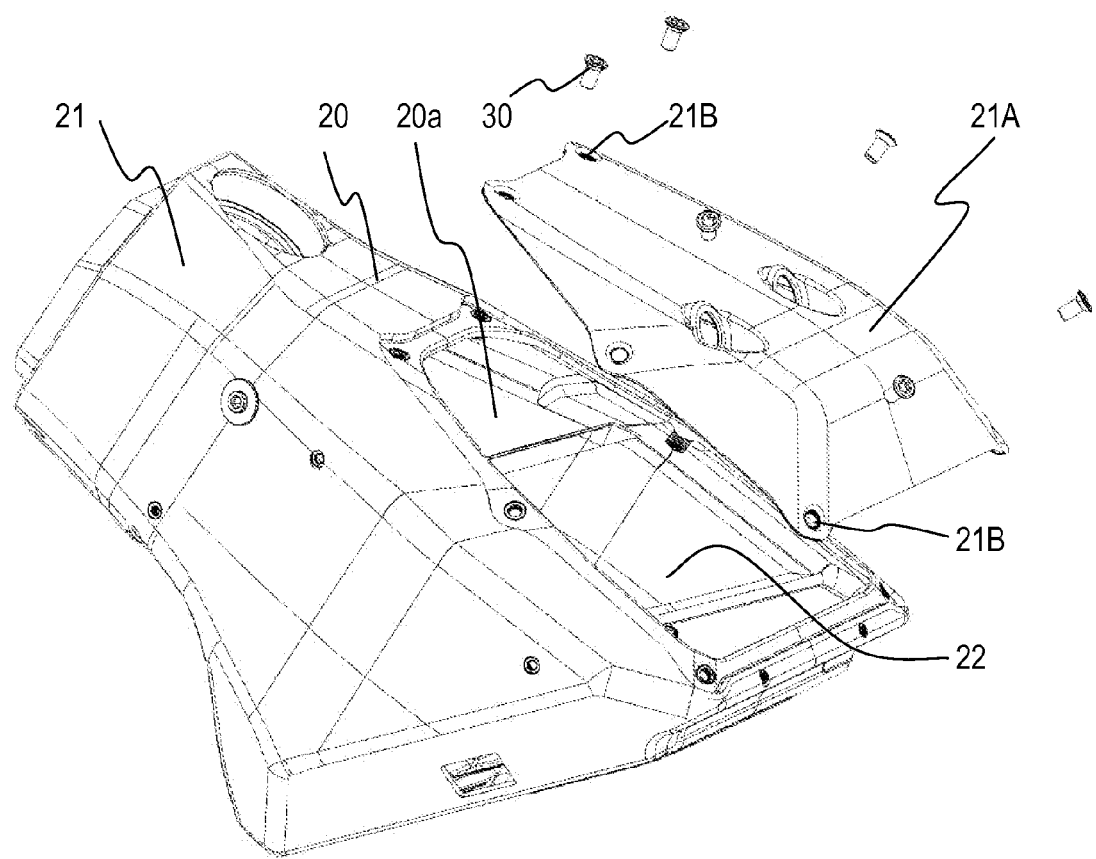
FIG. 4a shows the box of FIG. 4 and its removed portion and screws in an exploded view.

FIG. 4a shows the box-like body 20 with its top portion 20a exposed by removing removably connected cap or closure element 21A by unscrewing bolts 30 to expose an inner compartment 22. According to the invention the engine 2 is associated to the front directional group 10 by a box-like body 20 having its own functional feature in the motorcycle. Preferably, such box-like body 20 incorporates the function of airbox or filter box and it has a perimetric wall 21 delimiting the inner compartment 22 (apt, in the example, to contain the filters for the air) having openings 24 to send air to the engine 2 which, on itself, is of known type and it will not be further described. Such openings 24 are provided in a portion of the wall 21 directed towards the underlying engine 2 and far therefrom.

The box-like body 20 can be implemented in different materials such as composite material (for example carbon fibre) or light metal, for example aluminium or alloys thereof. It can also be a single piece or it can have two or more portions removably connected therebetween by means of fastening organs (for example bolts) known on themselves.

The box-like body 20 has a plurality of portions which can be removably connected therebetween as seen in FIG. 1 showing the box like body 20 has the perimetric wall 21 delimiting the inner compartment (22, see FIG. 4 or 5) on which is located the removably connected cap or closure element 21A. Near to the border of the closure element 21A are holes 21B suitable to contain bolts 30 for fixing the removably connected cap or closure element 21A to the wall 21 over top portion 20a (the same holes can be seen in FIG. 4 and FIG. 4a).

Figure 5:
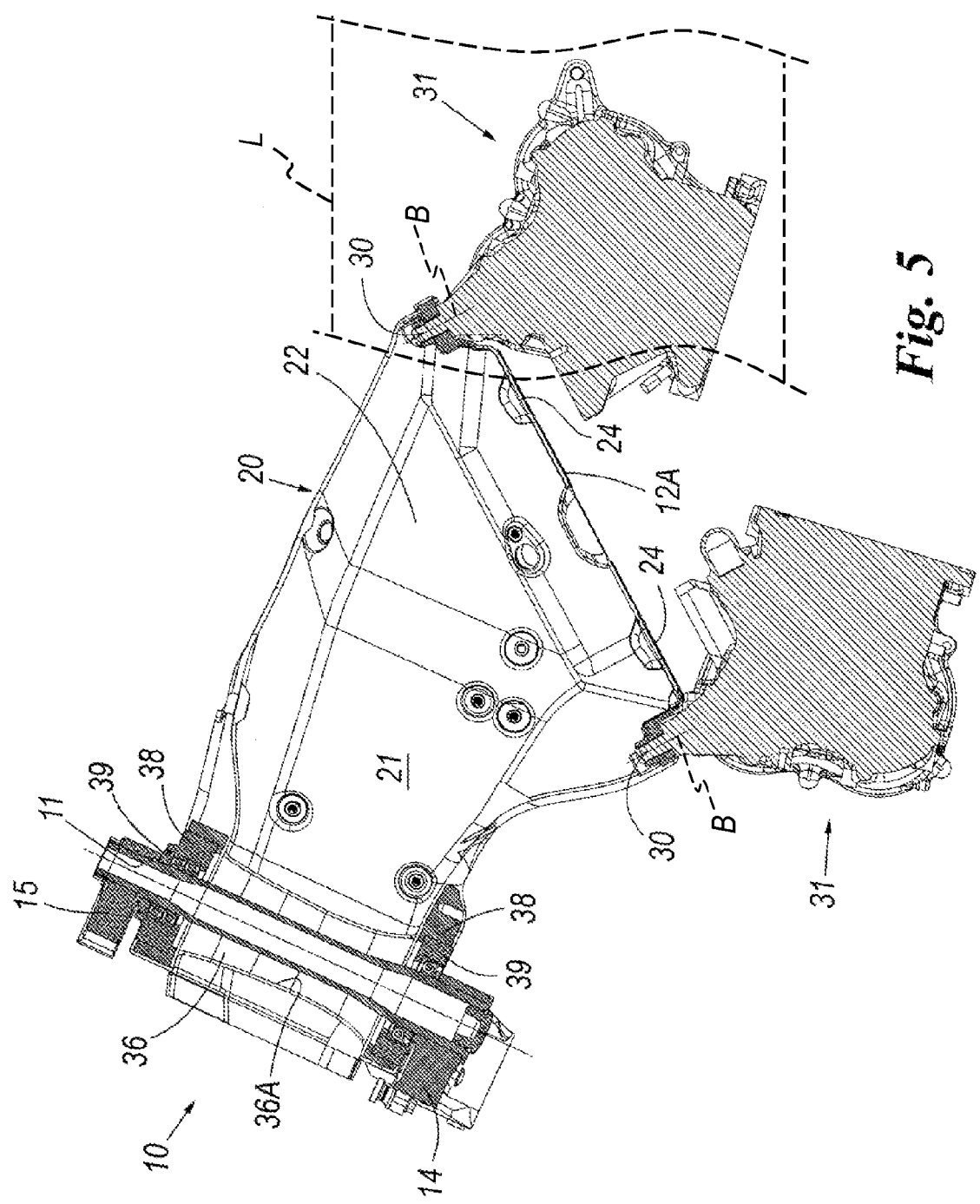
FIG. 5 shows a section according to the trace 5-5 of FIG. 1.

As seen in FIGS. 4 and 5 bolts 30 connecting the heads 31 of the engine to the box-like body 20 each have an axis B parallel to a longitudinal plane L of the vehicle.

The box-like body 20 is connected, by means of bolts 30, to heads 31 of the engine 2 and by means of such bolts said body 20 supports said engine and it constrains it, practically, to the directional group 10. More in particular, the body 20 has a front portion 35 (by referring to the position thereof on the vehicle) having a seat or through hole 36 for the steering headstock 11. At opposite ends of such seat 36 members 38 are provided, fastened to the body 20 in any known way and containing organs of mechanical decoupling (bearings) 39 fitted around the headstock 11 and apt to allow the rotation of the latter in the seat 36, even by keeping such headstock in axially fixed position within the latter that is so as to keep it in a pre-fixed position inside the seat and far from the wall thereof 36A.

In this way the box-like body 20 (thereto a usual, not shown tank is overlapped) is constrained to the group 10 and supports the engine group 2. To the latter, the support for the saddle 3 and the support 4 for the rear wheel 5 are thus associated. This by means of bolts 40. In the motorcycle according to the invention, then, the function of transferring the loads from the front wheels to the engine 2 is carried out by the body 20, whereas the engine supports the load coming from the rear wheels and the dynamic one of the driver and of the possible passenger. The so implemented motorcycle has no frame, a lattice-like frame or a frame implemented in any way, even if it has an efficient structure in terms of rigidity/mass ratio. Furthermore, thanks to the invention, there is an efficient cooling of the engine and the planning of the electric circuit, of the cooling one and of other structural and/or functional portions of the vehicle can be rationalized.

The invention claimed is:

1. A motorcycle comprising:
a propelling group or engine,
a saddle support,
a support for the rear wheel, and
a front directional group comprising a handlebar integral to a steering headstock functionally connected to a supporting organ of the vehicle front wheel, wherein such front group is connected to a box-like body incorporating the function of filtering box, constrained to the engine and for supporting the engine by connecting it, therethrough, to said front directional group,
said support for the rear wheel and said saddle support being constrained to the engine,
the vehicle being not equipped with a frame to constrain said engine to such front directional group, wherein said box-like body is fastened to the head of the engine by bolts and the bolts connecting the heads of the engine to the box-like body have axis parallel to a longitudinal plane of the vehicle, and the box-like body is located over the engine and not around it.

2. The motorcycle according to claim 1, wherein said box-like body is a single piece.

3. The motorcycle according to claim 1, wherein said box-like body has two or more portions removably connected therebetween by fastening organs.

4. The motorcycle according to claim 1, wherein such box-like body comprises a perimetric wall delimiting an inner department, openings being provided in a portion of such wall to send air to the engine.

5. The motorcycle according to claim 1, wherein said box-like body is fastened to the head of the engine.

6. The motorcycle according to claim 1, wherein said box-like body comprises a front portion having a seat or through hole for containing, in fixed axial position, the steering headstock.

7. The motorcycle according to claim 6, wherein at opposite ends of a seat there are members provided, fastened to the box-like body and containing organs of mechanical decoupling fitted around said steering headstock, said members allowing the related rotation of the headstock in said seat even if they keep it in fixed axial position.

8. The motorcycle according to claim 6, wherein said front portion of the box-like body interposes between two spaced-apart plates of the supporting organ of the front wheel, said supporting organ comprising, in addition to said plates and said steering headstock, a fork constrained to the wheel and a handlebar.

9. The motorcycle according to claim 1, wherein a tank of the vehicle overlaps, at least partially, on the box-like body.

10. The motorcycle according to claim 1, wherein said box-like body is made of composite material.

11. The motorcycle according to claim 1, wherein said box-like body is made of metal.

12. The motorcycle according to claim 1, wherein said box-like body is made of composite material comprising carbon fibre.

13. The motorcycle according to claim 1, wherein said box-like body is made of aluminium or alloys thereof.

14. The motorcycle according to claim 1, wherein the box-like body of the present invention comprises a front portion opened for enabling air flow to enter into the box-like body and to reach an opening for sending air to the engine.

15. The motorcycle according to claim 14, wherein said box-like body comprises a front portion having a seat for containing, in fixed axial position, the steering headstock;
the steering headstock is connected to the box-like body by the seat located inside the body, nothing is located in front of the opening through which the air enters to be sent towards the engine.

16. A motorcycle comprising:
a propelling group or engine,
a saddle support,
a support for the rear wheel, and
a front directional group comprising a handlebar integral to a steering headstock functionally connected to a supporting organ of the vehicle front wheel, wherein such front group is connected to a box-like body incorporating the function of filtering box, constrained to the engine and for supporting the engine by connecting it, therethrough, to said front directional group,
said support for the rear wheel and said saddle support being constrained to the engine,
the vehicle being not equipped with a frame to constrain said engine to such front directional group, wherein the box-like body of the present invention comprises a front portion opened for enabling air flow to enter into the box-like body and to reach an opening for sending air to the engine, wherein said box-like body comprises a front portion having a seat for containing, in fixed axial position, the steering headstock;
the steering headstock is connected to the box-like body by the seat located inside the body, nothing is located in front of the opening through which the air enters to be sent towards the engine.

\* \* \* \* \*